United States Patent [19]

Fujimura et al.

[11] 4,317,207
[45] Feb. 23, 1982

[54] DATA TRANSMISSION SYSTEM

[75] Inventors: Noriaki Fujimura, Tokyo; Tsuneo Kinoshita, Inagi; Tadashi Aono, Kawasaki; Takashi Kaku, Kawasaki; Yasuya Tanaka, Kawasaki, all of Japan

[73] Assignees: Nippon Telegraph and Telephone Public Corporation; Fujitsu Limited, both of Japan

[21] Appl. No.: 126,527

[22] Filed: Mar. 3, 1980

[30] Foreign Application Priority Data

Mar. 2, 1979 [JP] Japan .................................. 54-24257

[51] Int. Cl.³ ............................................ H04L 27/49
[52] U.S. Cl. ........................................ 375/19; 370/41;
340/347 DD; 371/56; 375/35; 375/121
[58] Field of Search ...................... 375/17, 19, 37, 52,
375/113, 121; 370/41; 371/49, 56; 178/69 D;
340/347 DD

[56] References Cited

U.S. PATENT DOCUMENTS

| 1,901,642 | 3/1933 | Hansell .................................. 375/52 |
| 3,457,550 | 7/1969 | Gibson et al. ....................... 375/121 |
| 3,611,141 | 10/1971 | Waters ................................. 375/19 |
| 3,898,388 | 8/1975 | Goodwin et al. .................... 375/113 |
| 4,208,650 | 6/1980 | Horn ..................................... 371/49 |

Primary Examiner—Benedict V. Safourek
Attorney, Agent, or Firm—Staas & Halsey

[57] ABSTRACT

A data transmission system wherein a transmitter always transmits the carrier to a receiver and modulates the carrier by using the sending data and a receiver demodulates the sending data, wherein, in order to discriminate whether the data demodulated in the receiver is sending data or not during an existing sending data period, the transmitter converts specified bits of sending data and then transmits and the receiver discriminates the sending data existing period according to detection of such conversion being carried out.

14 Claims, 7 Drawing Figures

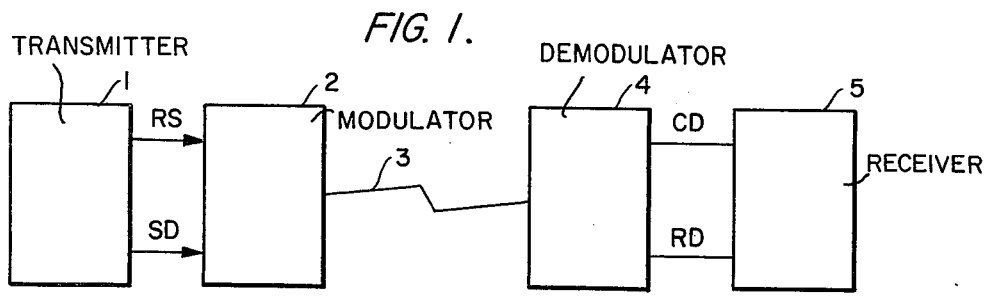
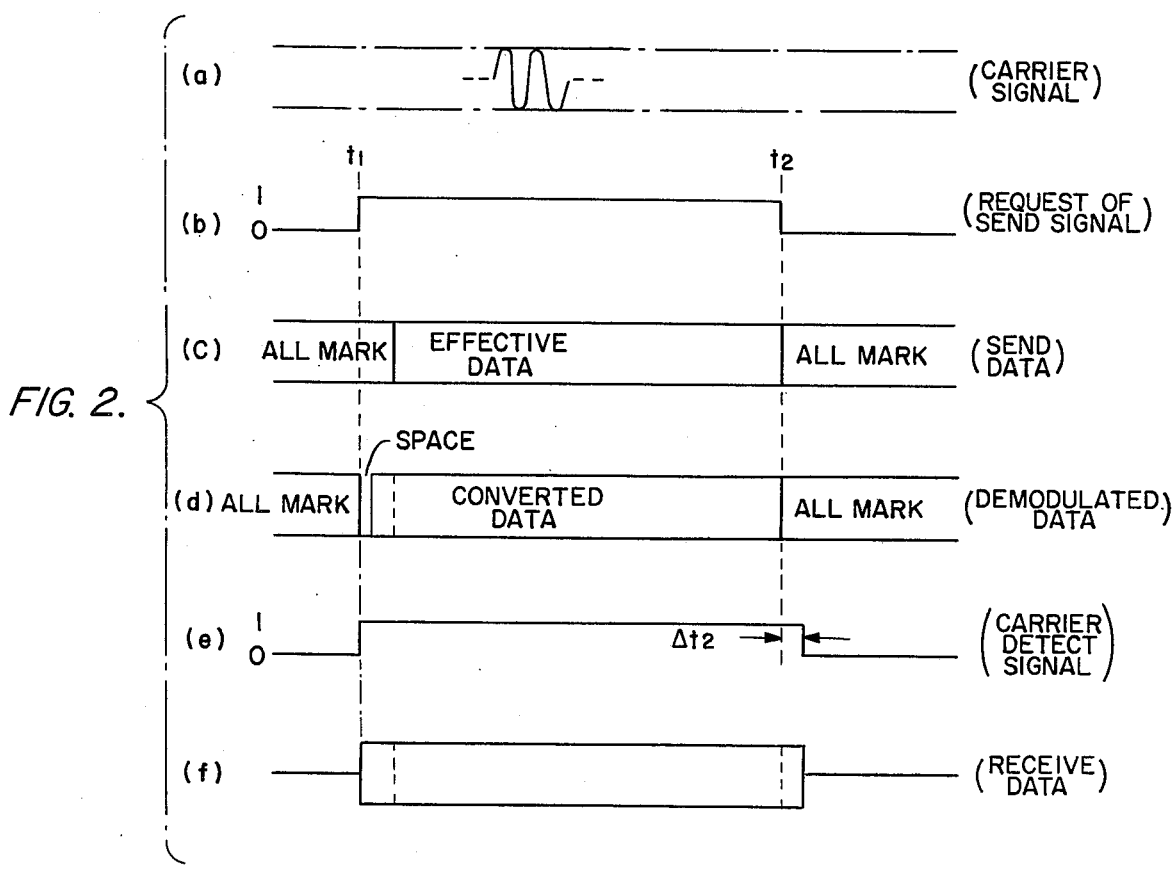

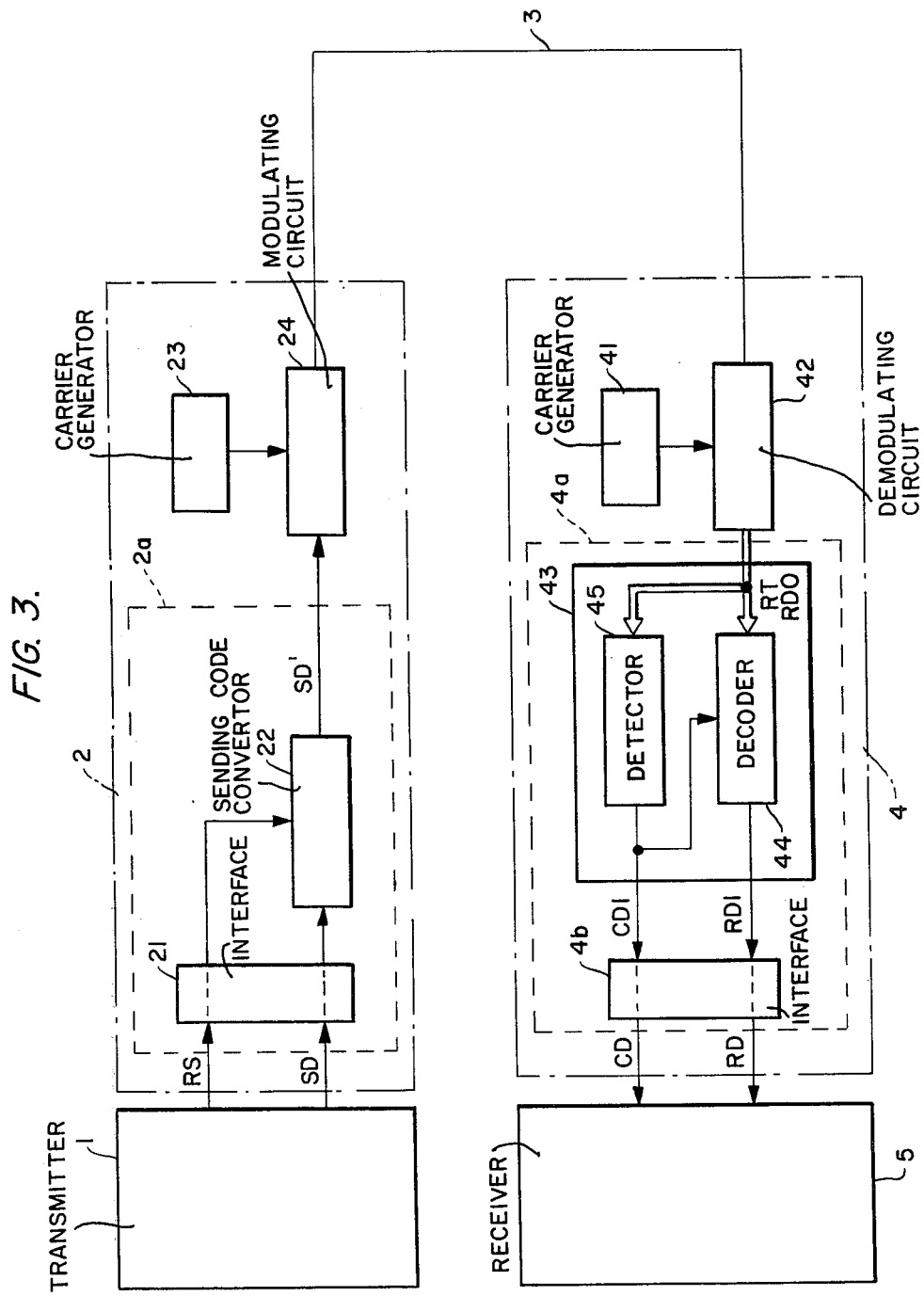

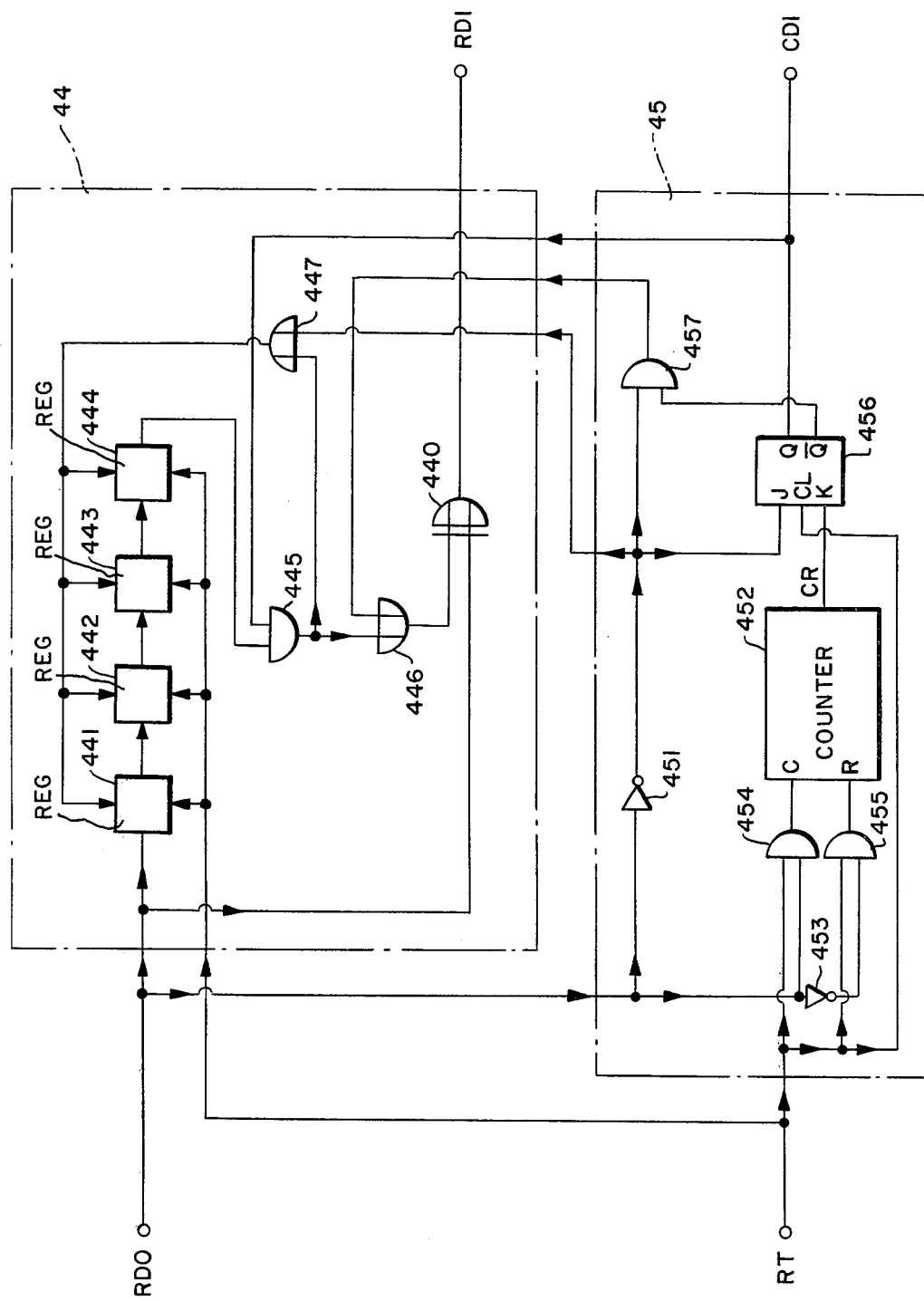

DATA TRANSMISSION SYSTEM

BACKGROUND OF THE INVENTION

A data transmission system is generally employed for transmitting data from the transmitter to the receiver where a carrier wave is modulated by a sending data signal.

This data transmission system comprises transmitting terminal equipment, a modulator, a demodulator and receiving terminal equipment. The transmitting terminal equipment is connected to the modulator, while the receiving terminal equipment is connected to the demodulator, and the modulator and demodulator are respectively connected by the telephone lines.

The signal sending and receiving methods between the equipment in the data transmission system having the above structure are specified in CCITT (THE INTERNATIONAL TELEGRAPH AND TELEPHONE CONSULTATIVE COMMITTEE) Recommendation V. 29.

According to this recommendation, when the transmitting terminal equipment issues a transmission request signal to the modulator, the demodulator should, in response to such a request signal, send a carrier detection signal to indicate that data is to be sent from the transmitter to the receiving terminal equipment.

In one prior demodulator, a carrier detection signal provides an output in accordance with the carrier extracted from the receiving signal in the demodulator.

On the other hand, it is proposed that such a data transmission system be subject to the condition that the carrier is always transmitted. Therefore such a data transmission system is required to accurately discriminate between the period where the data corresponding to predetermined information which must be transmitted to the receiving terminal equipment from the transmitting terminal equipment exists and the period where such data does not exist. But the prior system only detects the carrier signal and therefore it cannot detect the effective data period where data to be transmitted exists.

SUMMARY OF THE INVENTION

It is a first object of this invention to provide a system and method which effectively detects the period during which data to be transmitted exists.

It is a second object of this invention to provide a system which can detect a period during which transmitting data exists, without decreasing the number of data patterns used between the transmitting terminal equipment and receiving terminal equipment.

It is a third object of this invention to provide an encoding method for effectively preventing errors in detecting the period during which transmitting data exists.

It is a fourth object of this invention to provide a system for detecting the existence or non-existence of sending data at each receiving port of the demodulators corresponding to each piece of transmitting terminal equipment. In this system data signals sent from a plurality of pieces of transmitting terminal equipment to one modulator are sent on a line using a time division method and data signals are distributed to the demodulator on a plurality of corresponding terminals. The aforementioned and other objects of this invention will be made obvious from an embodiment explained hereunder.

BRIEF DESCRIPTION OF THE DRAWINGS

FIG. 1 is a block diagram of a data transmission system;

FIG. 2 is a time chart for the major part of the data transmission system of this invention;

FIG. 3 is a block diagram of the data transmission system of an embodiment of this invention;

FIGS. 3A and 3B are detailed block diagrams for each block shown in FIG. 3.

FIG. 5 illustrates the encoding method for an embodiment of this invention.

DESCRIPTION OF THE PREFERRED EMBODIMENT

Figure 3A:
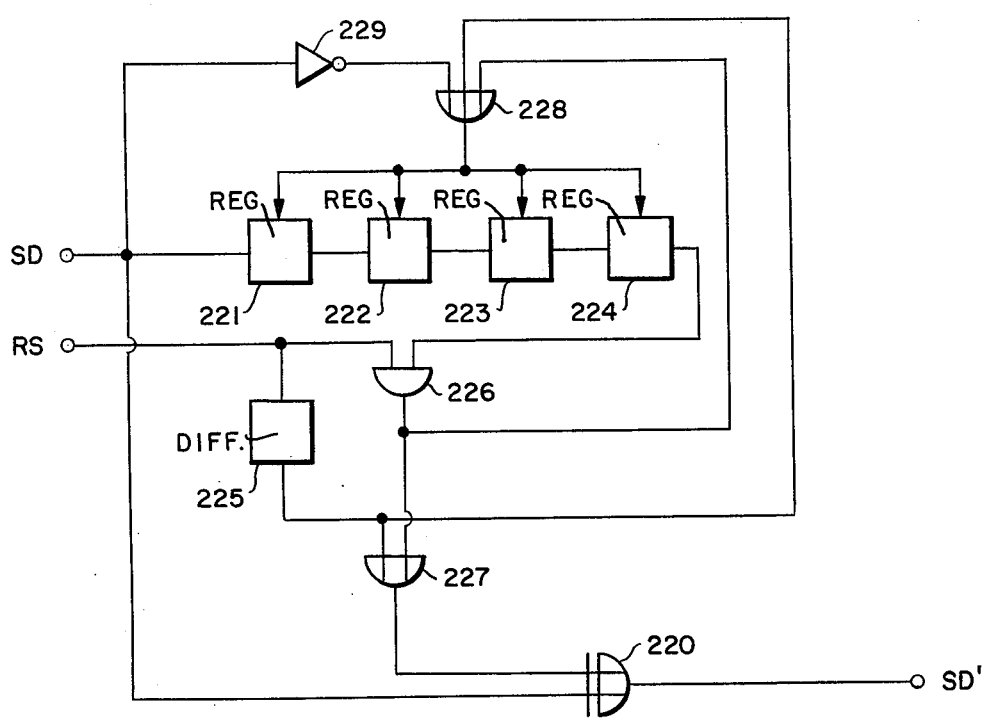

In FIG. 1, the transmitting terminal equipment 1 usually sends signals to the modulator 2 via the sending request signal line RS and sending data line SD. The transmitting terminal equipment 1 and the modulator 2 are set up so that, the transmitting terminal equipment 1 supplies the mark polarity data (equivalent to data of logic level "1") to the sending data line SD when there is no information to be sent from the transmitting terminal to the receiving terminal equipment 5. When the information and data pattern to be sent are determined in the transmitting terminal equipment 1, the transmitting terminal equipment 1 changes the sending request signal line RS from the logic level "0" (ground level, for example,) to the logic level "1" (+12 volts or 5 volts, for example). Then, the modulator 2 modulates the carrier with the mark polarity data and data including its data pattern and then sends it on line 3. The demodulator 4 first detects the carrier in the received signal and informs the receiving terminal equipment 5 of incoming data by changing the carrier detection signal line CD from the level "0" to the level "1". In addition, the demodulator 4 regenerates the data from the received signal and sends it to the receiving terminal equipment 5 via the receiving data line RD.

In the system of FIG. 1, however, neither the demodulator nor the receiving terminal equipment can detect the period during which effective data exists and the other period within the period during which the carrier is being received.

In the present invention, the period during which effective data exists is determined by converting the data input to the modulator into a specified format. Namely, it is enough to provide a data convertor, decoder and a circuit which detects such conversion within the system. Therefore, a particular code for detecting effective data is not required. Similarly, reduction of the kinds of data patterns such as inhibiting the use of a particular code as the output data pattern from the transmitting terminal equipment is not required. The present invention will be explained by referring to the chart in FIG. 2.

In FIG. 2, (a) is the carrier mentioned above, (b) is the sending request signal mentioned above, (c) is a sending data signal to be supplied to the modulator, (d) is a converted data signal demodulated by the demodulator, (e) is a carrier detection signal mentioned above indicating the data sending period, and (f) is a receiving data signal which the receiving terminal equipment obtains from the demodulator.

Condition 1. The sending request signal (b) is at logic level "0":

When the sending request signal (b) is at logic level "0", the transmitting terminal equipment does not request signal sending. Therefore the modulator modulates the carrier (a) with the continuous mark signal which is always supplied from the transmitting terminal station on the sending data signal line during this period and sends it on the telephone line.

At this time, the demodulator in the receiving side demodulates only the continuous mark signal and sends the carrier detection signal, logic level "0", to the receiving terminal equipment.

Condition 2. The sending request signal (b) is at logic level "1":

When the sending request signal (b) is at logic level "1", the transmitting terminal equipment requests signal sending. Therefore, the modulator encodes the sending data signal (c) supplied from the transmitting terminal equipment via line SD according to the rules A, B explained below at the timing after the rising time $t_1$ of the sending request signal (b).

A: The mark polarity bit data is inverted to space polarity bit data at the rising time $t_1$ of the sending request signal.

B: In case the mark polarity bit data is supplied continuously as the sending data signal for the predetermined number of bits n from the location of the space polarity bit data, the polarity of the bit data in the bit location next to the last bit data of said predetermined number of bits is inverted.

The modulator modulates the carrier (a) with the data signal (d) which has been subject to the abovementioned conversion and sends it on the line.

On the other hand, the demodulator provides a means for detecting the converted data signal (d) generated in accordance with the above rules A, B as will be explained later.

Namely, the space polarity bit data is detected in the demodulated data signal, the carrier detection signal (e) is set to logic level "1" corresponding to rule A above.

Simultaneously, the demodulator encodes the relevant space polarity bit data to mark polarity and then sends it to the receiving terminal equipment. Next, the demodulator detects, corresponding to the above rule B, that the mark polarity bit data continues for the specified number of bits just after the space polarity bit data, converts the polarity of the next bit data and sends it as the receiving data signal (f) to the receiving terminal equipment.

Condition 3. The sending request signal (b) changes from logic level "1" to "0" at the time $t_2$:

The modulator shifts to the condition 1 mentioned above from the condition 2 at the timing $t_2$. Thus, the mark polarity bit data is demodulated by the demodulator during the period after the time $t_2$. The demodulator changes the logic level of the carrier detection signal (e) from "0" to "1" with a delay time of $\Delta t_2$ from the time $t_2$ where it is detected that the mark polarity bit data continues for the predetermined number of bits, for example, 48 bits.

In FIG. 3, blocks having the function same as in FIG. 1 have the same reference numeral and 21 is an interface circuit; 22 is a sending code convertor; 23 is a carrier generator; 24 is a modulating circuit; 41 is a carrier generator for demodulation; 42 is a demodulating circuit; 43 is a receiving unit; 45 is a detector; 44 is a decoder; 46 is an interface circuit.

The interface circuits 21 and 46 are respectively connected to a plurality of interface signal lines in accordance with the abovementioned CCITT (THE INTERNATIONAL TELEGRAPH AND TELEPHONE CONSULTATIVE COMMITTEE) Recommendation V 29. FIG. 3 shows only the sending request signal line RS, sending data signal line SD, carrier detection signal line CD and receiving data signal line RD among the abovementioned signal lines.

The operation of the system will be explained with reference to FIG. 3. The sending request signal line RS and sending data signal line SD are connected to the sending code converter 22 via the interface circuit 21.

The sending code converter 22 carries code conversion for the signal supplied to the sending data signal line SD from the terminal equipment 1 in accordance with a signal level supplied to the sending request signal line RS. The sending code converter 22 generates a converted signal output SD'. FIG. 3A shows a practical block diagram of the sending code converter 22.

In FIG. 3A, 221, 222, 223, 224 are series connected 1-bit registers, forming a shift register. 225 is a differentiation circuit; 226 is an AND gate; 227, 228 are OR gates; 229 is an invertor; 220 is an exclusive OR gate.

The operation of the sending code converter 22 will be explained hereunder.

Condition 1. The sending request signal line RS is at logic level "0":

Then the output of the AND gate 226 is at logic level "0" and the output of the differentiation circuit 225 turns to logic level "0". Thereby the output of the OR gate 227 is logic level "0", allowing the exclusive OR gate 220 to operate as an OR gate. Therefore, the mark polarity data on the sending data signal line SD is output directly to the output line SD'.

Condition 2. The sending request signal line RS changes from the level "0" to "1":

The differentiation circuit 225 provides an output pulse of logic level 1 when the sending request signal line RS changes from the level "0" to "1". Thereby, the mark polarity data is inverted to the space polarity data by the exclusive OR gate 220. At this time, the 1-bit registers 221, 222, 223, 224 are cleared and placed at logic level "0" by the output of differentiation circuit 225 via the OR gate 228. Simultaneously, when the sending request signal line RS is set to the level "1", the AND gate 226 is set in the open state. The sending code converter 22 executes the aforementioned rule A at this timing.

Condition 3. The mark polarity data appears continuously on the sending data signal line and the sending request signal line RS is at logic level "1":

The mark polarity data is supplied bit by bit to the register 221 and then sequentially shifted to the registers 222, 223, 224. On the other hand, the sending data is also input concurrently to the exclusive OR gate 220 and invertor 229. The invertor 229 turns to logic level "1" when it has detected the space polarity data and clears registers 221, 222, 223, 224 via the OR gate 228. Therefore, an output of level "1" cannot be obtained from the register 224 in the final stage of the shift register if the mark polarity data is not supplied continuously for 4 bits as the sending data. Namely, while 4 bits of mark polarity data are shifted in the shift registers 221, 222, 223, 224, the sending data is output to the output line SD' via the exclusive OR gate 220. When 4 bits of mark polarity data are output continuously, the output signal of the register 224, at logic level "1", is supplied to the exclusive OR gate 220 via the AND gate 226 and OR gate 227. Thereby, the exclusive OR gate 220 outputs the sending data of the 5th bit after converting it to space polarity it is mark polarity or to mark polarity it is space polarity. Thus, this circuit 22 executes the abovementioned rule B.

With reference to FIG. 3, the data, which is code converted only when the sending request signal line RS is at logic level "1", is input to the modulating circuit 24. On the other hand, the modulating circuit 24 is always given a signal of specified frequency from the carrier generator 23. This modulating circuit 24 is structured so that it can modulate the carrier in view of taking 16 kinds of data in accordance with an amplitude and phase of the carrier. Therefore, the modulating circuit 24 at first separates the data output from the sending code converter 22 for each 4-bits. Then, the modulating circuit 24 modulates the carrier to produce a signal having a phase and amplitude corresponding to the data pattern partitioned in the relevant 4 bits, and sends it on line 3.

The demodulating circuit 42 in the demodulator 4 receives the signal transmitted on line 3 as mentioned above. Moreover, the demodulator 42 is given a carrier signal, which is similar to the carrier signal generated by the carrier generator 23, from the carrier generator 41. The carrier generator 41 is adjusted by the carrier automatic phase controller, which is not illustrated, with a well known method. On account of this adjustment, the carrier on the line can be equalized. The demodulating circuit 42 discriminates the phase and amplitude of the received signal with reference to the standard carrier signal sent from the abovementioned carrier generator 41. The demodulating circuit 42 outputs data same as the data, which is the appearing on the sending data line SD', to the output line RDO. Simultaneously, the demodulator 42 outputs the receiving timing, namely a timing pulse for discriminating data bits to the output line RT.

These two lines are supplied to the receiving unit 43 and input to the detector 45 and decoder 44, respectively. When space polarity data is found in the demodulated data, the detector 45 in the receiving unit 43 sets the carrier detection signal line CD1 to logic level "1". The decoder 44 decodes the demodulated data in accordance with the logic level of the carrier detection signal line CD 1. FIG. 3B illustrates an example of a circuit which may be used as the receiving unit 43. The blocks and lines which are the same as those in FIG. 3 are given the same reference numerals or symbols in FIG. 3B.

In FIG. 3B, in addition, 441, 442, 443, 444 are respectively 1-bit registers, forming a shift register in the series connection. In FIG. 3B, 452 is a counter; 456 is a JK type flip-flop; 445, 454, 455, 457 are AND gates; 446, 447 are OR gates; 440 is an exclusive OR gate; 451, 453 are invertors.

The, operation of the receiving unit will be explained below.

Condition 1. The demodulated data are all mark polarity data:

The AND gate 454 of the detector 45 is opened by the demodulated mark polarity data. In addition, the AND gates 455, 457 are closed via the invertors 453, 451. The timing pulse supplied to the receiving timing signal line RT is supplied to the counter terminal C of the counter 452 via the AND gate 452. The counter 452 counts the number of continuous mark polarity bit data by counting the number of timing pulses. When the counter 452 counts up to the specified value, for example, 48 bits, it provides an output signal of level "1". This output signal is then input to the terminal K of the JK flip-flop 456 for resetting the flip-flop 456. Thus, the Q output of flip-flop 456 is logic level "1", while the $\overline{Q}$ output is logic level "0". The level of the carrier detection signal line CD1 is set to logic level "0" when the mark polarity data continues for 48 bits. Also, the AND gate 445 of the decoder 44 is closed. Thereby, the AND gate 445 has an output of logic level "0". As explained above, the AND gate 457 is closed, keeping the output at logic level "0". Thus, since one of the input terminals of the exclusive OR gate 440 is at logic level "0", the data on the demodulation data line RD0 is transmitted on the line RD1.

Condition 2. The demodulated data are space polarity data in accordance with rule A:

The AND gates 455, 457 are opened when the space polarity data in these circuits is inverted to logic level "1" by the invertors 453, 451. On the other hand, the flip-flop 456 makes effective an input of terminal K with the timing pulse next to that where the counter 452 is reset as will be explained later and logic counter 452 keeps the line CR at the level "0". For this purpose, the flip-flop 456 outputs the $\overline{Q}$ output at logic level "1" when this space polarity data appears. Thereby, this space polarity data is inverted by the invertor 451, and the AND gate 457 is opened, during the period where the signal of logic level "1" is supplied to the AND gate 457, by the $\overline{Q}$ output and outputs a signal of logic level "1". This signal of level "1" causes the exclusive OR gate 440 to invert the space polarity data to the mark polarity and then output via the OR gate 446. When the AND gate 454 is closed and AND gate 455 is opened, the timing pulse is input to the terminal R of the counter 452 for resetting. Thus, the receiving unit 43 carries out the decoding operation corresponding to the abovementioned rule A. The operation of the system when space polarity data is detected is explained below. The Q output of flip-flop 456 is set to logic level "1" by the space polarity data. Thereby, the AND gate 445 is opened. Moreover, the registers 441, 442 444 are reset by the output signal of logic level "1" of the invertor 451.

Condition 3. The mark polarity data continues for 4 bits under this condition:

The 4-bit mark polarity data is sequentially shifted in the receiving timing to the registers 441, 442, 443 and 444. When the mark polarity data is shifted to the register 444, the output signal of logic level "1" of the register 444 causes the polarity of the 5th bit data to be inverted using the exclusive OR gate 440 via the AND gate 445 and OR gate 446. Thereby, the receiving unit 43 executes the decoding operation corresponding to the abovementioned rule B.

Condition 4. The period during which the space polarity data exists shifts to a period where it does not exist:

The period during which only the mark polarity data exists means that the transmitting terminal equipment sets the sending request signal line RS to logic level "0" as explained previously, and there is no request for data transmission.

The number of continuous bits of mark polarity data are counted by the counter 452 as mentioned previously. Therefore when the period shifts to that where only the mark polarity data exists, the counter 452 is never reset by the space polarity data. Thus the counter 452 counts the mark polarity data of 48 bits and supplies an output signal of level "1" to the output line CR. Thereby, the flip-flop 456 is reset and its Q output is kept at the level "0". Namely, the signal level of the carrier detection signal line CD 1 is changed from "1" to "0".

As explained above with reference to FIG. 3, the receiving unit 43 outputs a signal corresponding to the signal appearing on the sending request signal line RS and the sending data signal line SD 1 to each of the carrier detection signal line CD 1 and data signal line RD 1. The interface circuit 46 sends the signals on the lines CD 1 and RD 1 to the receiving terminal equipment 5 via the lines CD and RD. As explained in detail previously, the period during which data to be sent exists is indicated to the receiving side from the transmitting side.

Figure 4:
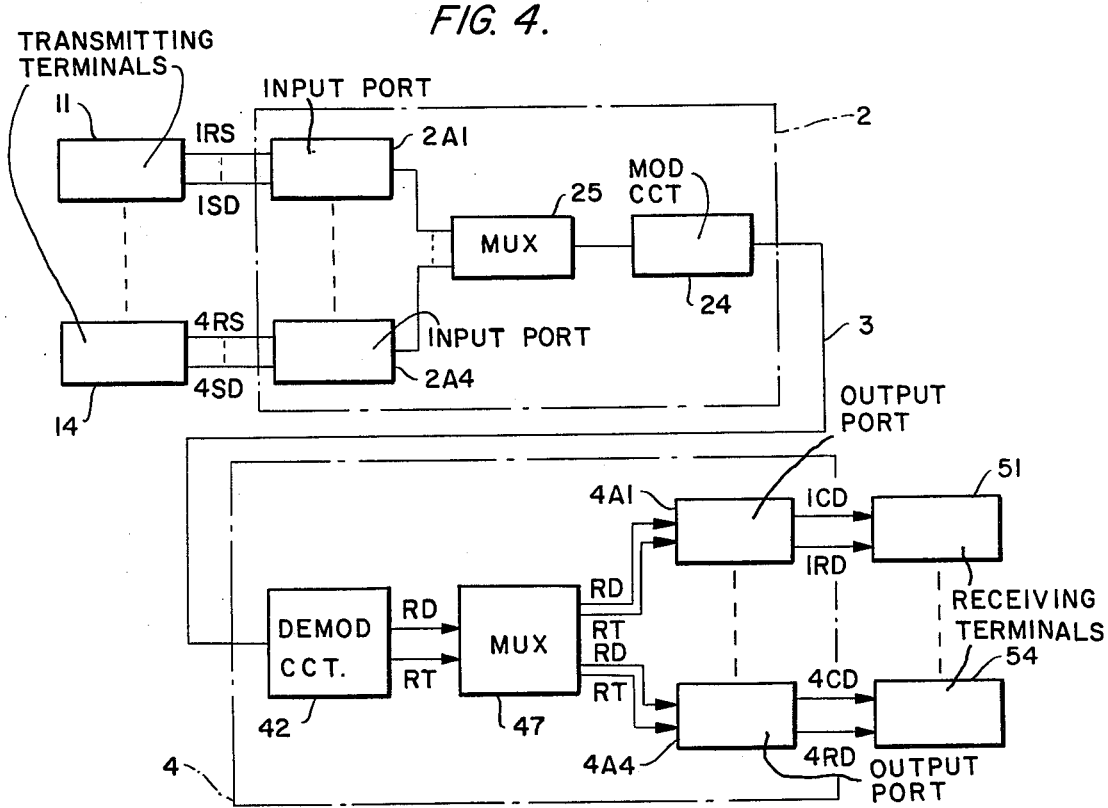
FIG. 4 is a block diagram of a data transmission system according to another embodiment of this invention.

FIG. 4 shows a block diagram of a system which realizes data transmission between plural pieces of transmitting terminal equipment and corresponding plural pieces of receiving terminal equipment on a time division multiplex basis.

In this figure 11 to 14 are transmitting terminals; 2A1 to 2A4 are input ports; 25, 47 are multiplexers; 4A1 to 4A4 are output ports; 51 to 54 are receiving terminals. Each of the input ports 2A1 to 2A4 has the structure same as that of the part 2a enclosed by the dotted line in FIG. 3. A detailed explanation of it is omitted here. In addition, each of the output ports 4A1 to 4A4 has the same structure as part 4a enclosed by the dotted line in FIg. 3. A detailed explanation of it is omitted here.

In the system of FIG. 4, the transmission rate of each port is 2400 BPS and therefore transmission may be carried out on line 3 at the rate of 9600 BPS. Each of the transmitting terminals 11 to 14 has inputs including the sending data and the sending request signal to the corresponding input port as in the case of the transmission terminal equipment 1 explained previously.

The multiplexer 25 in the modulation unit 2 multiplexes the sending data 1SD, 2SD, 3SD, 4SD which are supplied from each port. The modulator 24 then modulates them at the rate, for example, of 9600 BPS and sends to the line 3. The demodulating circuit 42 in the demodulator 4 in the received side regenerates the receiving data, receiving timing from the receiving signal as mentioned previously. The multiplexer 47 distributes the data and receiving timing pulse transmitted to the ports 4A1 to 4A4 by counting the receiving timing pulses.

The receiving data distributed to the ports 4A1 to 4A4 have been subjected to bit inversion in every 5th bit of the original sending data as in the case of the data output from each of ports 2A1 to 2A4, so long as the sending request signals of said corresponding ports 2A1 to 2A4 are given. If such sending request signal is not given, this distributed receiving data is all mark polarity signal. Moreover, the timing pulse of ports 4A1 to 4A4 to be supplied to said receiving timing signal line RT is only the timing pulse corresponding to the distributed received data. Therefore, in accordance with this timing pulse, the level of the carrier detection signal line of the receiving unit having each port mentioned above changes following a change in level of the sending request signal line in the remote transmitting terminal.

Referring to FIG. 5, when the signal is demodulated the logic level of a signal indicating the data sending period is changed to "0" from "1" when the receiving data continues for a predetermined number, for example, 48 bits or more for extracting the carrier detection signal corresponding to ports. In contrast, the receiving side recognizes a change in the sending request signal. Therefore, it is necessary to guarantee that there is no chance that the mark polarity receiving data continues 48 bits or more during the sending request signal even if an error including bit inversion is contained in the receiving data for some reason. The sending code converter 22 in FIG. 3 is provided to give this guarantee and it carries out bit inversion for the given sending data in every 5 bits of mark polarity data, for example, so long as the level of the sending request signal is "1". In addition, the sending data is, so long as it is effective data, composed of 7 bit data and 1 parity bit.

If the effective sending data has the pattern indicated at the top of FIG. 5 under the condition that the sending request signal exists, the converted sending data are all mark polarity data. Therefore, the carrier detection signal erroneously changes to logic level "0" in the receiving side. However, such effective sending data is given the odd parity (even parity is also allowable), for example, in units of 8 bits. From this fact, it could be understood that the parity bits are contradicted in the maximum of 48 bits even when bits in unit of 8 bits are grasped in any phase as indicated I, II, III, . . . , VIII. In contrast, so long as the sending data is effective, it never has the pattern shown at the top of FIG. 5 and it is very rare that the carrier detection signal erroneously changes to the level "0" in the receiving side. For example, when the transmission rate of sending data is 2400 BPS and the timer for counting the mark polarity data in the demodulator in the receiving side detects continuous marks longer than 48 bits and thereby the carrier detection signal changes from the level "1" to "0", of erroneous of all marks of 48 bits occur once in every $2^{48} \times 48/2400$ (sec), when considering the sending data is random data because the number of times of reception where 48 bits are received during a second is 2400/48. This probability means such an error occurs once in about every $6 \times 10^5$ years and in essence the risk of the carrier erroneously dropping is almost perfectly eliminated.

The results of the invention explained above are itemized below.

(1) The sending period of data including effective data in FIG. 2 can be provided to the receiving side by the bit inversion of sending data.

(2) Since the data sending period is provided to the receiving side by code inversion of sending data in FIG. 2, a particular data pattern for discrimination is not required.

(3) In FIG. 2, FIG. 3A, FIG. 3B, the first polarity inversion is carried out in the sending side in synchronization with the rise of the sending request signal, the first polarity inversion is detected and a rise of the data sending period is detected in the receiving side. Therefore, operations in the sending and receiving sides can be synchronized and the sending side and receiving side can operate in the same timing.

(4) In FIG. 3A, FIG. 3B, since the polarity is always inverted after the specified number of bit data having the continuous polarity following the first polarity inversion according to item (3) above and the second polarity inversion condition can be detected in the receiving side even if the first polarity inversion condition can not be detected, misdetection of rising part of the data sending period can be prevented.

(5) Since the falling of the data sending period is discriminated in FIG. 3B by detecting the condition that polarity inversion is not carried out by the counter, namely by the time watching means, misdiscrimination due to erroneous data during the data sending period does not occur.

(6) Even in the system shown in FIG. 4 where plural terminals can be faced to a single line by providing the multiplexers in the modulator unit and demodulator unit, data can be sent between transmitting terminal equipment and receiving terminal equipment and the data sending period at each receiving port of receiving side can be discriminated.

What is claimed is:

1. A data transmission system comprising:
   a transmitter for generating a carrier signal and for generating a modulated carrier signal wherein said carrier signal is modulated in accordance with a sending data signal during a communication period;
   a transmission line, coupled to said transmitter, for providing said modulated carrier signal;
   a receiver, coupled to the transmission line, for demodulating said modulated carrier signal to provide a receiving data signal;
   said transmitter inverts specified bits of said sending data in accordance with a sending request signal and modulates the carrier signal with the sending data signal including the bit inverted data;
   said receiver regenerates the data in the sending data signal including said bit inverted data, detects that said bit inverted data exists, and decodes said bit inverted data if said bit inverted data is detected.

2. A data transmission system according to claim 1, wherein said transmitter counts data bits having a specified polarity and inverts the polarity of the data bits when the count reaches a specified number.

3. A data transmission system according to claim 2, wherein said transmitter further inverts the polarity of the data bits in a leading portion of the sending data signal in accordance with the sending request signal.

4. A data transmission system according to claim 1, wherein said receiver includes means for counting a continuous number of data bits having a specified polarity and means for detecting a pause period during which data having a polarity opposite the specified polarity does not exist.

5. A data transmission system according to claim 1, wherein said transmitter comprises a plurality of transmitter units, a plurality of sending code converters, one of which is connected to each of said transmitter units, a multiplexing means for time division multiplexing the output data signals of said plurality of sending code converters, and a modulator for modulating the carrier signal with the multiplexed output data signal; and the receiver comprising a demodulator for demodulating a received signal, a plurality of receiver units corresponding to each of said transmitter units, each of said plurality of receiver units comprising detection means for detecting whether said bit inverted data exists and a receiving code converter, and a distribution means for distributing the demodulated and multiplexed data to the corresponding receiving units.

6. A data transmission system according to claim 1, wherein a unit word of the sending data signal having an information signal is formed during the communication period by n unit data in number with addition of parity data, and the transmitter inverts the polarity of the (p+1)th unit data which is less than n in number when the p unit data which is less than n in number continues.

7. A data transmission system, operatively connected to means for generating a first carrier signal and means for generating a second carrier signal, comprising:
   transmitting terminal means for generating a sending request signal and a sending data signal, said sending data signal including effective data;
   sending code converter means, operatively connected to said transmitting terminal means, for performing code conversion on said sending data signal by inverting specified bits of said sending data signal in accordance with the level of said sending request signal and for generating a converted data signal;
   modulator means, operatively connected to the means for generating the first carrier signal and to said sending code converter means, for modulating the first carrier signal with the converted data signal and for generating a modulated transmission signal;
   demodulator means, operatively connected to the means for generating the second carrier signal and to said modulator means, for demodulating the modulated transmission signal to regenerate said converted data signal and for generating a receiving timing signal;
   detector means, operatively connected to said demodulator means, for detecting whether code conversion has taken place and for generating a carrier detection signal in accordance with said converted data signal;
   decoder means, operatively connected to said detector means and said demodulator means, for decoding said converted data signal in accordance with said carrier detection signal in order to generate a receiving data signal; and
   receiving terminal means, operatively connected to said detector means and said decoder means, for receiving said carrier detection signal and said receiving data signal, wherein the period during which the effective data is to be sent is indicated by said carrier detection signal in accordance with said sending request signal which is generated by said transmitter means.

8. A data transmission system as set forth in claim 7, further comprising:
   a first interface circuit operatively connected between said transmitting terminal means and said sending code converter means; and
   a second interface circuit operatively connected between said receiving terminal means and said detector and decoder means.

9. A data transmission system as set forth in claim 7, wherein said sending code converter means comprises:
   a first shift register, operatively connected to said transmitting terminal means at a first node, said first shift register having an input for receiving said sending data signal, having a clear input through which a clear signal is received and having an output;
   a first inverter having an input connected at said first node and having an output;
   a first OR gate, having a first input connected to the output of said inverter, having second and third inputs and having an output connected to the clear input of said first shift register;

a differentiator circuit, having an input connected to said transmitting terminal means at a second node and having an output connected to the second input of said first OR gate, said input of said differentiator circuit receiving said sending request signal;

a first AND gate, having a first input connected at said second node, having a second input connected to the output of said first shift register and having an output connected to the third input of said first OR gate at a third node;

a second OR gate, having a first input connected to the output of said differentiator circuit, having a second input connected at said third node and having an output; and a first exclusive OR gate, having a first input connected at said first node, having a second input connected to the output of said second OR gate, and having an output operatively connected to said modulator means, wherein said converted data signal is provided at the output of said exclusive OR gate.

10. A data transmission system as set forth in claim 7 or 9, wherein said detector means comprises:

a second AND gate, having a first input connected to said demodulator means at a fourth node for receiving said receiving timing signal, having a second input connected to said demodulator means at a fifth node for receiving said converted data signal and having an output;

a second inverter having an input connected at said fifth node and having an output;

a third AND gate, having a first input connected at said fourth node, having a second input connected to the output of said second inverter and having an output;

counter means, operatively connected to the outputs of said second and third AND gates, for generating a counted signal;

a third inverter having an input connected at said fifth node and having an output;

a first flip-flop, having a first input connected to the output of said third inverter at a sixth node, having a second input connected to said counter means for receiving said counter signal, having a clock input connected at said fourth node, having a first output and having a second output connected to said decoder means and to said receiving terminal means, wherein said second output of said first flip-flop provides said carrier detection signal; and a fourth AND gate, having a first input connected at said sixth node, having a second input connected at the first output of said first flip-flop and having an output connected to said decoder means.

11. A data transmission system, as set forth in claim 10, wherein said decoder means comprises:

a second shift register, having an input for receiving said converted data signal connected at said fifth node, having a clear input, having a timing input connected at said fourth node and having an output;

a fifth AND gate, having a first input connected to the output of said second shift register, having a second input connected to the second output of said first flip-flop, said second input for receiving said carrier detection signal, and having an output;

a third OR gate, having a first input connected to the output of said fifth AND gate, having a second input connected at said sixth node, and having an output connected to the clear input of said second shift register;

a fourth OR gate, having a first input connected to the output of said fifth AND gate, having a second input connected to the output of said fourth AND gate and having an output; and a second exclusive OR gate, having a first input connected to the output of said fourth OR gate, having a second input connected at said fifth node for receiving said converted data signal and having an output operatively connected to said receiving terminal means, wherein said receiving data signal is provided at the output of said second exclusive OR gate.

12. A data transmission system as set forth in claim 11, wherein said first and second shift registers comprise four one-bit registers connected in series.

13. A data transmission system as set forth in claim 12, wherein said first flip-flop is a JK flip-flop.

14. A data transmission system, operatively connected to means for generating a first carrier signal and means for generating a second carrier signal, comprising:

first and second transmitting terminal means for generating first and second sending request signals and first and second sending data signals, respectively;

first and second sending code converter means, operatively connected to said first and second transmitting terminal means, respectively, said first sending code converter means for performing code conversion on said first sending data signal in accordance with the level of said first sending request signal and for generating a first converted data signal, said second sending code converter means for performing code conversion on said second sending data signal in accordance with the level of said second sending request signal and for generating a second converted data signal;

multiplexer means, operatively connected to said first and second sending code converter means, for multiplexing said first and second converted data signals to generate a multiplexed signal;

modulator means, operatively connected to said multiplexer means and to the means for generating the first carrier signal, for modulating the first carrier signal in accordance with the multiplexed signal and for providing, as an output, a transmission signal;

demodulator means, operatively connected to said modulator means, for demodulating said transmission signal to regenerate said multiplexed signal and to generate a receiving timing signal;

demultiplexer means, operatively connected to said demodulator circuit, for demultiplexing said multiplexed signal and said receiving timing signal and for regenerating said first and second converted data signals and for providing first and second receiving timing signals;

first and second detector/decoder means, operatively connected to said demultiplexer means, said first detector/decoder means for generating a first carrier detection signal in accordance with said first converted data signal and for decoding said first converted data signal in accordance with said first carrier detection signal to provide a first receiving data signal, said second detector/decoder means for generating a second carrier detection signal in accordance with said second converted data signal in accordance with said second carrier detection signal;

first and second receiving terminal means, operatively connected to said first and second detector/decoder means, respectively, wherein said first receiving terminal means receives said first carrier detection signal and said first receiving data signal and wherein said second receiving terminal means receives said second carrier detection signal and said second receiving data signal.

* * * * *

UNITED STATES PATENT AND TRADEMARK OFFICE
CERTIFICATE OF CORRECTION

PATENT NO. : 4,317,207

DATED : February 23, 1982

INVENTOR(S) : NORIAKI FUJIMURA ET AL.

It is certified that error appears in the above—identified patent and that said Letters Patent is hereby corrected as shown below:

```
Column 2, line 12, "." should be --;--;
          line 24, delete ",";
Column 4, line 60, after "of", insert --logic--;
Column 5, line 30, start new paragraph with "The";
          line 34, after "data", insert --, which is the--;
          line 35, delete "which is the".
Column 6, line 32, after "of", insert --logic--;
          line 43, after "442", insert --,--;
          line 58, "where" should be --during which--.
Column 7, line 11, delete "1";
          line 32, "FIg" should be --FIG--;
          line 45, "received" should be --receiving--;
          line 46, "receiving" should be --received--.
Column 11, line 45, "counter" should be --counted--.
```

Signed and Sealed this

Twenty-second Day of June 1982

[SEAL]

Attest:

GERALD J. MOSSINGHOFF

Attesting Officer    Commissioner of Patents and Trademarks